US007413086B2

(12) United States Patent
Kato et al.

(10) Patent No.: US 7,413,086 B2
(45) Date of Patent: Aug. 19, 2008

(54) INLINE SIFTER

(75) Inventors: Fumio Kato, Handa (JP); Teruo Inoue, Toukai (JP)

(73) Assignee: Tsukasa Industry Co., Ltd., Aichi (JP)

( * ) Notice: Subject to any disclaimer, the term of this patent is extended or adjusted under 35 U.S.C. 154(b) by 66 days.

(21) Appl. No.: 11/454,938

(22) Filed: Jun. 19, 2006

(65) Prior Publication Data

US 2006/0237347 A1 Oct. 26, 2006

Related U.S. Application Data

(62) Division of application No. 10/416,233, filed on May 8, 2003, now Pat. No. 7,093,718.

(51) Int. Cl.
*B07B 1/20* (2006.01)
*B01D 29/00* (2006.01)

(52) U.S. Cl. ....................... 209/300; 209/262; 209/306; 55/471; 55/473

(58) Field of Classification Search ............. 209/21-23, 209/44.3, 714, 285, 300, 305, 306, 262, 286; 55/471, 473, 302
See application file for complete search history.

(56) References Cited

U.S. PATENT DOCUMENTS

| | | | | |
|---|---|---|---|---|
| 117,990 A | | 8/1871 | Damp | 209/22 |
| 304,682 A | | 9/1884 | Gorton | 209/406 |
| 1,571,736 A | | 2/1926 | Reed et al. | 209/273 |
| 3,845,863 A | * | 11/1974 | Savia | 209/303 |
| 3,928,188 A | | 12/1975 | Link et al. | 209/250 |
| 4,294,692 A | | 10/1981 | Keller | 209/300 |
| 4,310,412 A | * | 1/1982 | Murakami et al. | 209/10 |
| 4,799,595 A | | 1/1989 | Binder | 209/135 |
| 5,458,246 A | | 10/1995 | Thom | 209/300 |
| 5,593,042 A | | 1/1997 | Keller | 209/261 |
| 5,707,488 A | | 1/1998 | Markham | 162/4 |
| 7,093,718 B2 | * | 8/2006 | Kato et al. | 209/262 |

FOREIGN PATENT DOCUMENTS

| | | |
|---|---|---|
| DE | 3503043 A1 | 7/1986 |
| JP | 87537 | 1/1982 |
| JP | 6369577 | 3/1988 |
| JP | 3131372 | 6/1991 |
| JP | 6303 | 1/1994 |
| JP | 11244784 | 9/1999 |

* cited by examiner

*Primary Examiner*—Joseph C Rodriguez
(74) *Attorney, Agent, or Firm*—Mattingly, Stanger, Malur & Brundidge, P.C.

(57) ABSTRACT

An inline sifter including a gas-powder mixture receiving module which receives a mixture of a gas and powdery material from an inlet, a sieving module which communicates with a supply chamber of the gas-powder mixture receiving module, a rotating mechanism which is laterally extended inside the supply chamber and the sieving chamber, a cylindrical sieve arranged such that the rotating shaft extended in said sieving chamber passes through a center thereof, a wind power amplifier located in an internal area of the sieve to amplify wind power and press the powdery material out from the sieve, a removal member used to remove a remaining material from the sieve, an outlet used to discharge material which has passed through the sieve, and a support member. The gas-powder mixture, being supplied in a circumferential direction of the supply chamber, flows around the rotating shaft and is fed into the sieving chamber.

2 Claims, 18 Drawing Sheets

(a)

(b)

INLINE SIFTER

The present application is a divisional application of application Ser. No. 10/416,233, filed May 8, 2003, now U.S. Pat. No. 7,093,718, the contents of which are incorporated herein by reference.

BACKGROUND OF THE INVENTION

The present invention relates to an inline sifter, which is disposed in a pneumatic transportation line of a powdery material of, for example, a food product, a chemical product, or a medicinal product and sieves the powdery material.

One example of prior art inline sifters is shown in FIGS. 16 through 18. This inline sifter 301 is disposed in the middle of an air-driven transportation line. A vertical housing 302 is mounted on a stand 303. A cylindrical sieve 304 is fixed inside the housing 302 to have its axis in the vertical direction. An inlet 305 and an outlet 306 are arranged below the housing 302, and an air supply element 307 is disposed on the upper side of the housing 302. Four air nozzles 308 are suspended from the air supply element 307 to the inside of the sieve 304. The air is ejected from the air nozzles 308 at regular intervals, in order to relieve the clogging of the sieve 304. A high-pressure mixture of a powdery material and the air is pressed out of the inlet 305 and is fed into the sieve 304. After removal of aggregates of the powdery material and foreign substances by means of the air ejected from the air nozzles 308, the powdery material with the air flow, which has passed through the sieve 304, is discharged from the outlet 306. The aggregates of the powdery material and the foreign substances, which are not allowed to pass through the sieve 304, inversely flow through the inlet 305 and are taken out of a powder discharge port 309. The inline sifter is disposed in the middle of a gas-driven transportation line and is applicable to loose shipment equipment, blender-powder feeding equipment, dumping powder feeding equipment, and silo equipment.

Because of the structural limitation, the inlet 305 and the outlet 306 have bends of small curvatures. This structure undesirably increases the pressure loss. The powdery material in the housing 302 and the inlet 305 is naturally under the influence of gravity. The powdery material is to be pressed out against the gravity. This causes a large pressure loss in the housing 302 and the sieve 304. The inside of the housing 302 has a practically identical pressure, which is positive relative to the atmosphere. The structure of pressing out the powdery material has a large pressure loss and a low sieving efficiency and makes the sieve 304 easily clogged. The rough mesh of the sieve 304 may, however, cause insufficient removal of foreign substances.

SUMMARY OF THE INVENTION

The object of the invention is thus to reduce the pressure loss and enhance the sieving efficiency of an inline sifter disposed in a pneumatic transportation line.

In order to attain at least part of the above and the other related objects, the present invention is directed to an inline sifter, which includes: a gas-powder mixture receiving module that is provided with a supply chamber, which receives a mixture of a gas and a pneumatically transported powdery material from a gas-powder mixture inlet; a sieving module that is provided with a sieving chamber, which laterally communicates with the supply chamber of the gas-powder mixture receiving module; a rotating mechanism that is provided with a rotating shaft, which is laterally extended inside the supply chamber and the sieving chamber; a cylindrical sieve that is arranged such that the rotating shaft extended in the sieving chamber passes through a center thereof; a wind power amplifier that is located in an internal area of the sieve and has multiple blades fixed to the rotating shaft to amplify wind power and press the powdery material out of the sieve; a removal member that is used to remove a remaining powdery material, which has not passed through the sieve, from the internal area of the sieve; and an outlet that is used to discharge a sieved powdery material, which has passed through the sieve from the internal area toward an external area.

The wind power produced by the mechanical high-speed rotation of the blades functions as an intermediate auxiliary energy amplifier (also called a booster) of pneumatic transportation. The wind power sucks the gas-powder mixture from the gas-powder mixture receiving module and amplifies the wind power in the inline sifter. The amplified wind power has a turbo action to press-feed the powdery material toward the sieve. This arrangement desirably enhances the sieving efficiency and effectively reduces the pressure loss to a negligible level.

For example, in the case of pressure-type pneumatic transportation from an upstream line with a rotary valve, the inside of the upstream line has a positive pressure. The wind power (pressure) produced by the rotating wind power amplifier causes the inside of the supply chamber to have a negative pressure (in a suction-feeding state), while causing the inside of the outlet to have a positive pressure. The combination of this negative pressure with the positive pressure accelerates the downstream flow of the gas-powder mixture and significantly reduces the pressure loss. In the case of suction-type pneumatic transportation, the combination of negative pressures works to feed the gas-powder mixture.

It is preferable that the gas-powder mixture receiving module and the sieving module are formed integrally with a casing, a housing, a cover, or the like.

In a preferable embodiment, the blades have a long sheet shape and are symmetrically arranged. The line joining the symmetrically arranged blades runs through the center of the rotating shaft. The arrangement of the blades is not restricted to symmetrical but may be asymmetrical.

The wind power amplifier is preferably received in the sieve. In one preferable application, the blades of the wind power amplifier are extended from the sieve to the supply chamber.

It is preferable that the volume of the supply chamber is less than the volume of the sieving chamber.

For the purpose of size reduction, it is preferable that the length of the supply chamber in the axial direction of the rotating shaft is less than the length of the sieving chamber. A preferable range is, for example, ⅓ to ⅕.

It is also preferable that the diameter of the gas-powder mixture inlet is less than the diameter of the gas-powder mixture receiving module. A tube is preferably applied to the gas-powder mixture inlet.

In the inline sifter described above, the wind power amplifier has: a support member that is radially extended from the rotating shaft; and the multiple blades that are joined with the support member and are extended in either an axial direction of the rotating shaft or a direction inclined to the axial direction, where respective ends of the multiple blades are located close to an inner circumferential face of the sieve.

In one preferable embodiment, two or more support members are fixed to the rotating shaft at preset or adequate intervals. The support member has sheet-like protrusion elements radially extended from the center thereof.

In the inline sifter described above, the supply chamber has a cylindrical face, and the gas-powder mixture inlet is connected in a circumferential direction to the cylindrical face of the gas-powder mixture receiving module. In the inline sifter of this arrangement, the gas-powder mixture inlet is attached to an adequate position on the outer circumferential face of the gas-powder mixture receiving module. The gas-powder mixture is supplied in the circumferential direction or preferably in a tangential direction from the circumferential face of the supply chamber, flows around the rotating shaft, and is fed into the supply chamber.

In the inline sifter described above, all or part of the multiple blades are extended from the internal area of the sieve to the supply chamber of the gas-powder mixture receiving module. For example, when the upstream line has a rotary valve and a blower, at the initial stage of pneumatic transportation, the gas-powder mixture supplied from the gas-powder mixture inlet is pulsated, which may result in unstable supplies into the sieve. The extended blades desirably relieve the pulsation of the gas-powder mixture and ensure stable supplies of the gas-powder mixture into the sieve.

In the inline sifter described above, the support member has multiple protrusion elements, which are of an identical number with the multiple blades and are radially projected, and a through hole formed on a central portion thereof to receive the rotating shaft passing therethrough. This structure of the support member integrates the multiple blades. The end of the protrusion element has a notch to receive and fix each blade fit therein.

In the inline sifter described above, the sieving module has a side opening, the sieve has a size accessible and replaceable via the side opening, and the removal member is an inspection door that opens and closes the side opening and enables the remaining powdery material, which has not passed through the sieve, to be taken out of the internal area of the sieve. The side opening may be formed at a position opposite to the rotating mechanism.

In the inline sifter described above, the rotating shaft has one cantilevered end on the side of the gas-powder mixture receiving module and the other free end extended to a middle of the sieve.

It is preferable that the cantilevered end is supported by multiple bearings.

In the inline sifter described above, the removal member has an exhaust port, which is provided with an openable and closable valve or shutter and is connected to a foreign substance reservoir disposed inside or outside of the removal member, and the remaining powdery material that has not passed through the sieve is discharged through the open valve or shutter to the foreign substance reservoir.

The valve may be opened and closed manually or may automatically be opened and closed with a variation in pressure. This arrangement enables the powdery material and the foreign substances left in the sieve to be discharge manually or automatically. In a preferable structure, the valve is attached to a joint of the exhaust port with the foreign substance reservoir. For example, the valve is a handle for the manual operations and is a solenoid valve for the automatic operations.

In the inline sifter described above, a tube with a slit and a rotating mechanism for rotating the tube are disposed in the sieving chamber in the external area of the sieve, and a high-pressure pulsed gas supplied from a high-pressure pulsed gas generator is ejected from the slit to generate shock waves and thereby blow off the powdery material adhering to the sieve and inside surface of the sieving module.

In a preferable structure, each of the tubes has multiple slits aligned in a longitudinal direction or in the axial direction, and multiple tubes are disposed at different positions.

The rotating mechanism preferably includes a motor.

The high-pressure pulsed gas generator preferably includes a diaphragm solenoid valve, a high-pressure accumulation tank for supplying the high-pressure pulsed air to the diaphragm solenoid valve, and a compressor for supplying the high-pressure pulsed air to the high-pressure accumulation tank.

BRIEF DESCRIPTION OF THE DRAWINGS

FIG. 6(*b*) is a front view showing a scraper in the first embodiment;

DETAILED DESCRIPTION OF THE INVENTION

Figure 1:
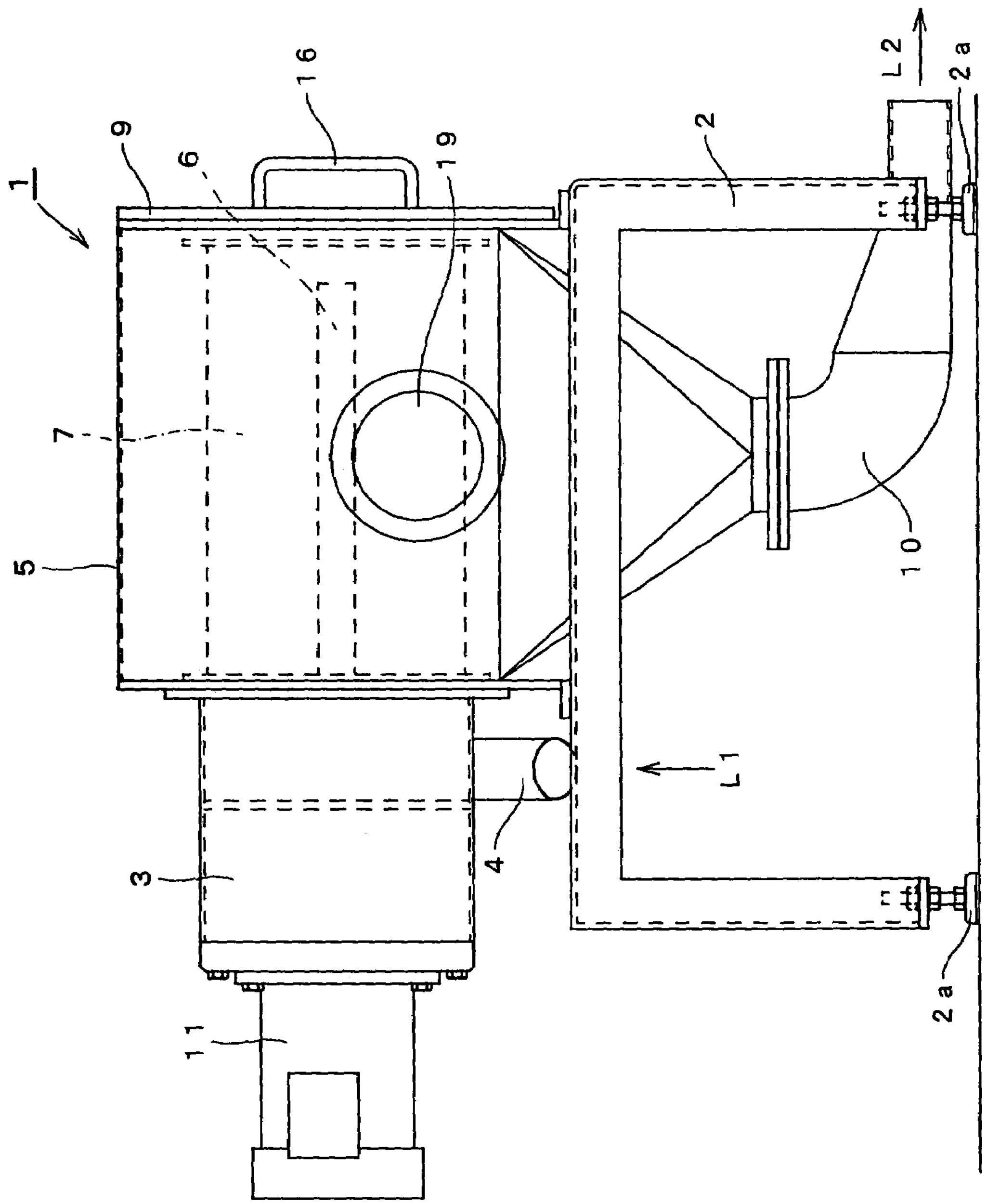
FIG. 1 is a front view showing an inline sifter in a first embodiment of the present invention.
Figure 2:
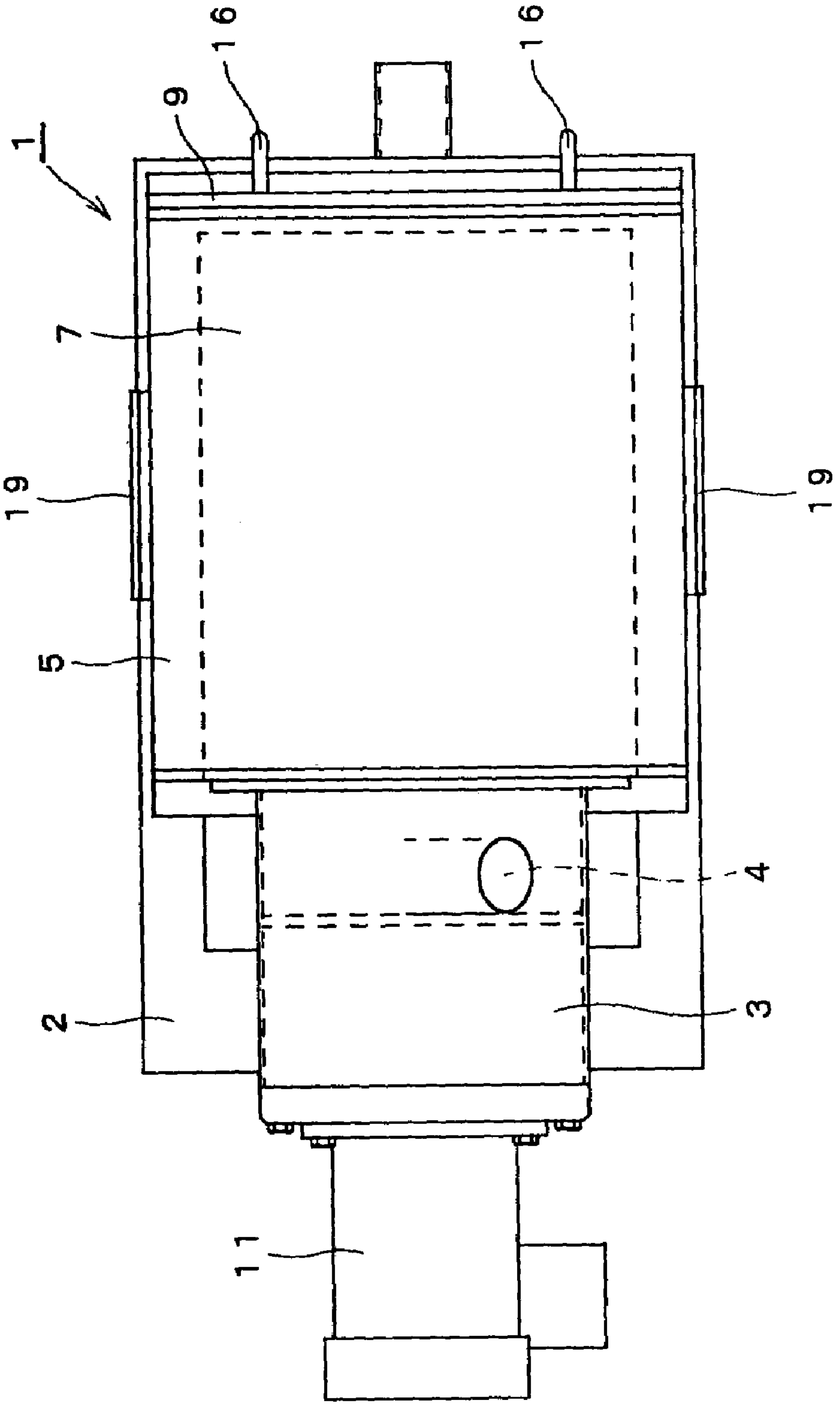
FIG. 2 is a plan view showing the inline sifter in the first embodiment.
Figure 3:
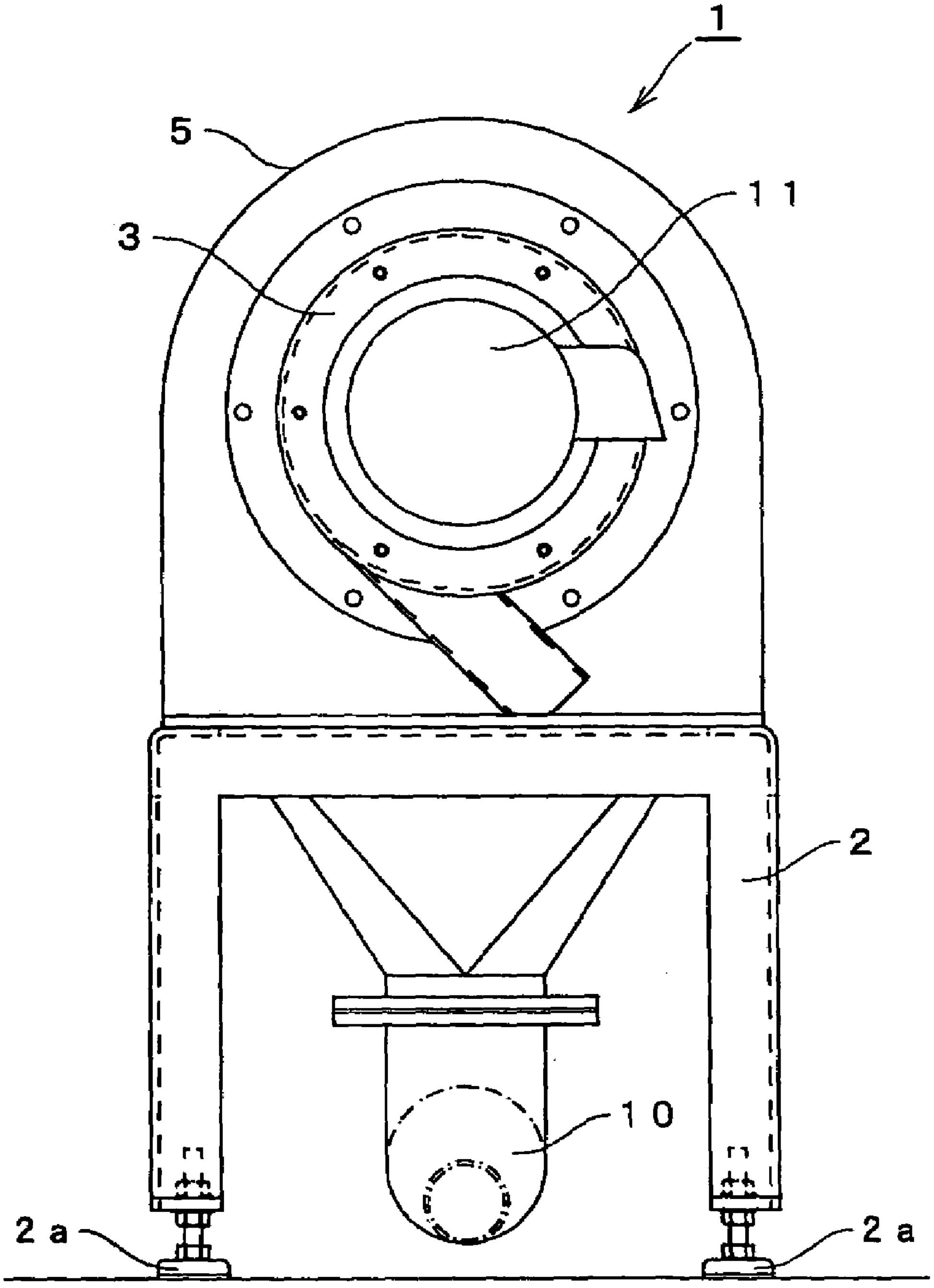
FIG. 3 is a left side view showing the inline sifter in the first embodiment.

An inline sifter 1 in a first embodiment of the invention is discussed with reference to FIGS. 1 through 6. This inline sifter 1 has a stand 2 with support legs 2*a*, an air-powder mixture receiving module 3 that receives a mixture of a pneumatically transported powdery material and the air, and an air-powder mixture inlet 4 of a cylindrical tube that is joined with the air-powder mixture receiving module 3 and feeds the air-powder mixture, which is flown from an upstream line L1 via an upstream blower and an upstream rotary valve (not shown), to the air-powder mixture receiving module 3. The inline sifter 1 further includes a sieving module 5 that has one end fixed to the air-powder mixture receiving module 3 and laterally communicates with the air-powder mixture receiving module 3, a rotating shaft 6 that is horizontally extended and is arranged inside the air-powder mixture receiving module 3 and the sieving module 5, and a cylindrical sieve 7 that is disposed inside the sieving module 5. The inline sifter 1 also has a booster 8 that is integrally formed with the rotating shaft 6 and is arranged inside the sieve 7 to be rotatable in an extended form and function as a wind power amplifier, an inspection door 9 that is attached to the sieving module 5 for removal of substances, which have not passed through the sieve 7, and for inspection of the inside, an outlet connecting pipe 10 that is disposed below the sieving module 5 to discharge the powdery material, which has passed through the sieve 7, to a downstream line L2, and a motor 11 that revolves the rotating shaft 6. The respective constituents are discussed in detail below.

Figure 5:
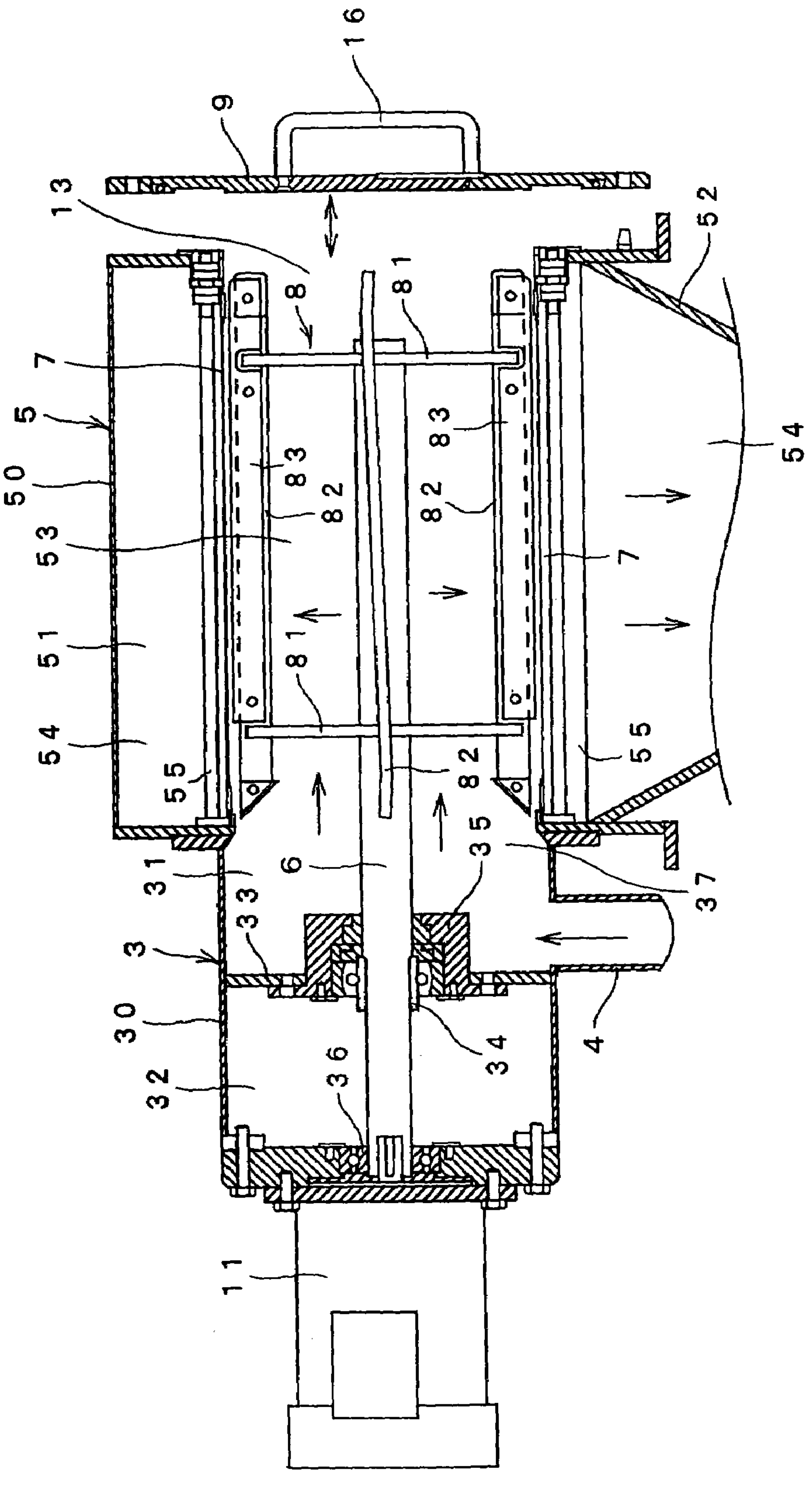
FIG. 5 shows the internal structure of the main part of the inline sifter in the first embodiment.

As shown in FIG. 5, the air-powder mixture receiving module 3 has a cylindrical supply housing 30, a cylindrical supply chamber 31 that communicates with the air-powder mixture inlet 4 connected tangentially obliquely with the outer circumferential face of the supply housing 30, a bearing chamber 32 that receives bearings therein, and a partition wall 33 that separates the supply chamber 31 from the bearing chamber 32. The air-powder mixture receiving module 3 also has a shaft hole 34 that is formed in the partition wall 33 to receive the rotating shaft 6 passing therethrough, a first bearing 35 that is attached to the shaft hole 34 to rotatably support the rotating shaft 6, a second bearing 36 that is formed on the left end of the air-powder mixture receiving module 3 to rotatably support the rotating shaft 6 at a position closer to the shaft end than the first bearing 35, and a passage 37 that feeds the mixture of the air and the powdery material into the sieving module 5. The first bearing 35 and the second bearing 36 are cartridge-type units. The first bearing 35 has a labyrinth ring and an air purge (not shown). The incident angle of the air-powder mixture inlet 4 to the supply chamber 31 is desirably the tangential direction of the outer face of the supply housing 30 and is set equal to 45 degrees in this embodiment. The incident angle may be varied in a range of 0 to 90 degrees according to the entrance position of the air-powder mixture inlet 4.

As shown in FIG. 5, the sieving module 5 has a sieve housing 50 that has a larger diameter than that of the air-powder mixture receiving module 3 and is formed in a reverse U-shape from the side view, a sieving chamber 51 that is located inside the sieve housing 50 and communicates with the supply chamber 31, and a hopper-like air-powder mixture outlet 52 located below the sieve housing 50. The cylindrical sieve 7 is arranged concentrically with the sieving chamber 51, such that the rotating shaft 6 passes through the center thereof. The sieve 7 has an internal area 53 that communicates with the supply chamber 31. The sieving chamber 51 has a quasi double cylindrical structure, in which the sieve 7 separates the internal area 53 from an external area 54. The outlet connecting pipe 10 is attached to the lower end of the air-powder mixture outlet 52.

The rotating shaft 6 has a cantilevered structure, and its free end is projected toward the right end of the sieve 7 inside the sieving chamber 51.

The sieve 7 has an internal diameter substantially identical with the internal diameter of the supply housing 30 and a length substantially identical with the length of the sieving chamber 51. The sieve 7 has a finer mesh (for example, 0.5 mm) than the prior art structure. The sieve 7 is detachably attached to the sieve housing 50 via a sieve fixture 55.

Figure 6:
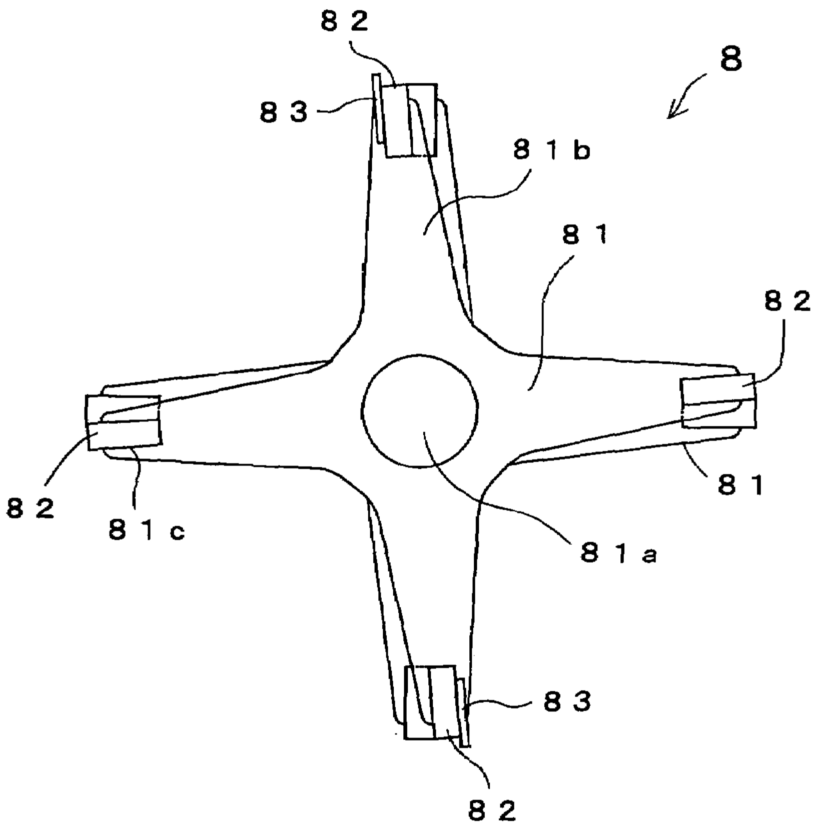
FIG. 6(*a*) is a side view showing a booster in the first embodiment.
Figure 6:
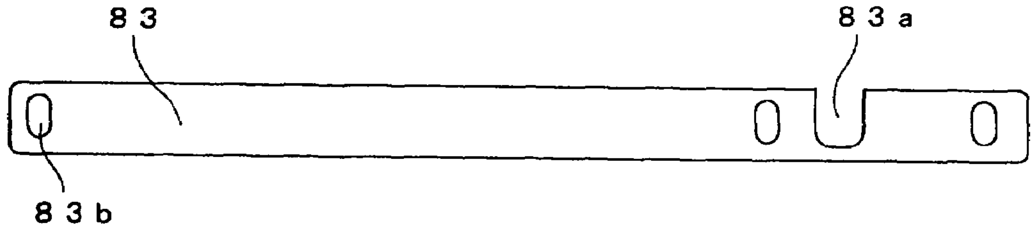
Figure 7:
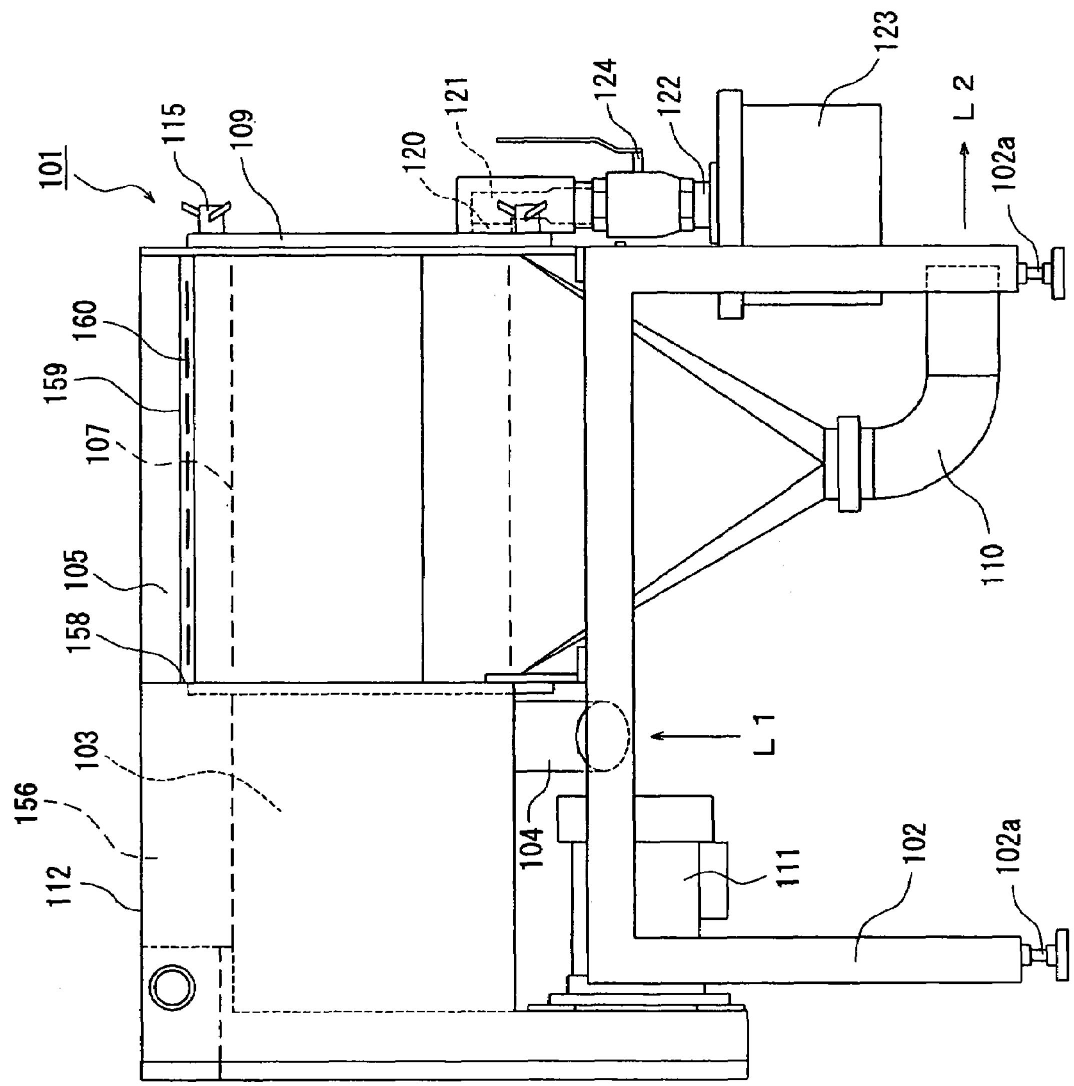
FIG. 7 is a front view showing an inline sifter in a second embodiment of the present invention.
Figure 8:
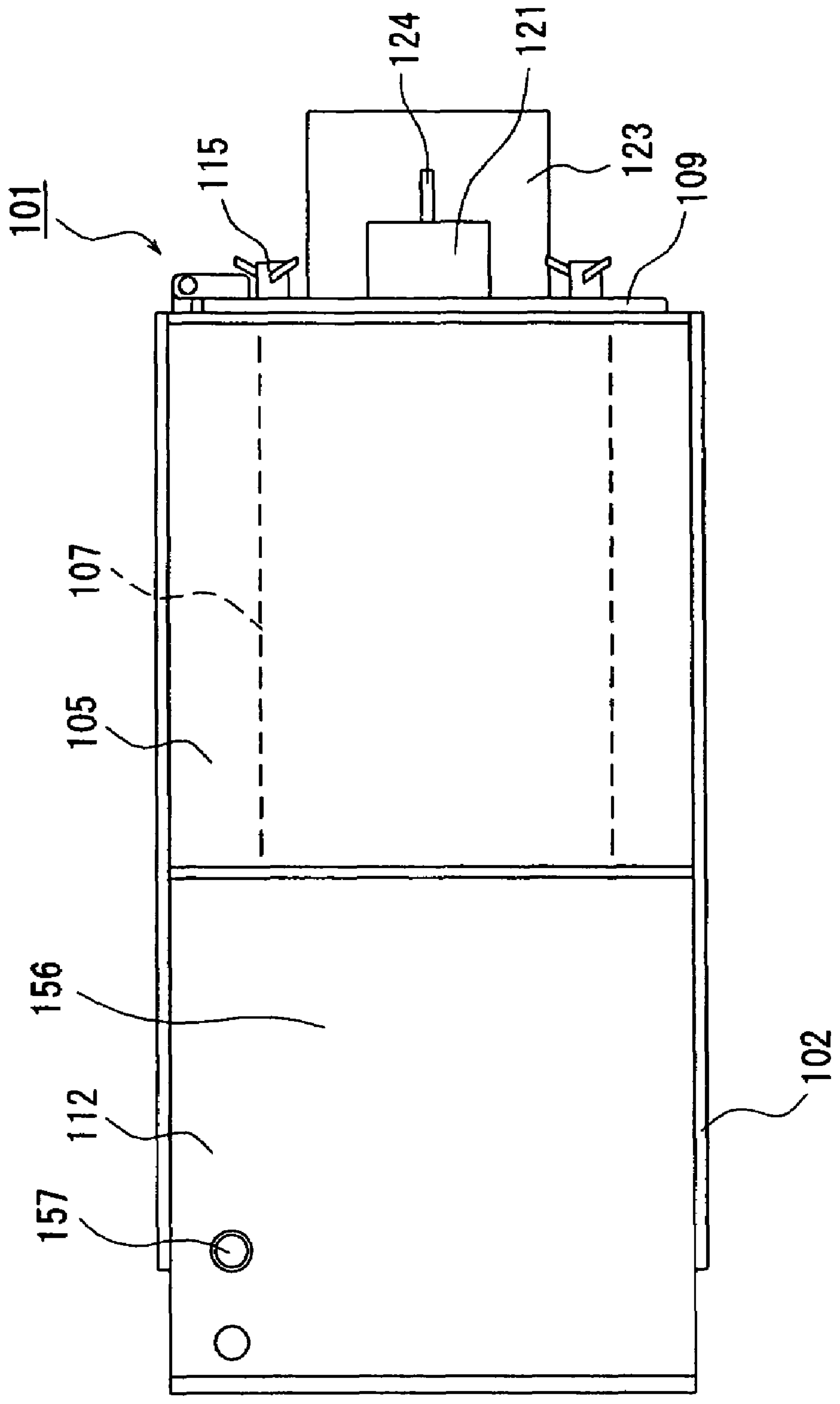
FIG. 8 is a plan view showing the inline sifter in the second embodiment.
Figure 9:
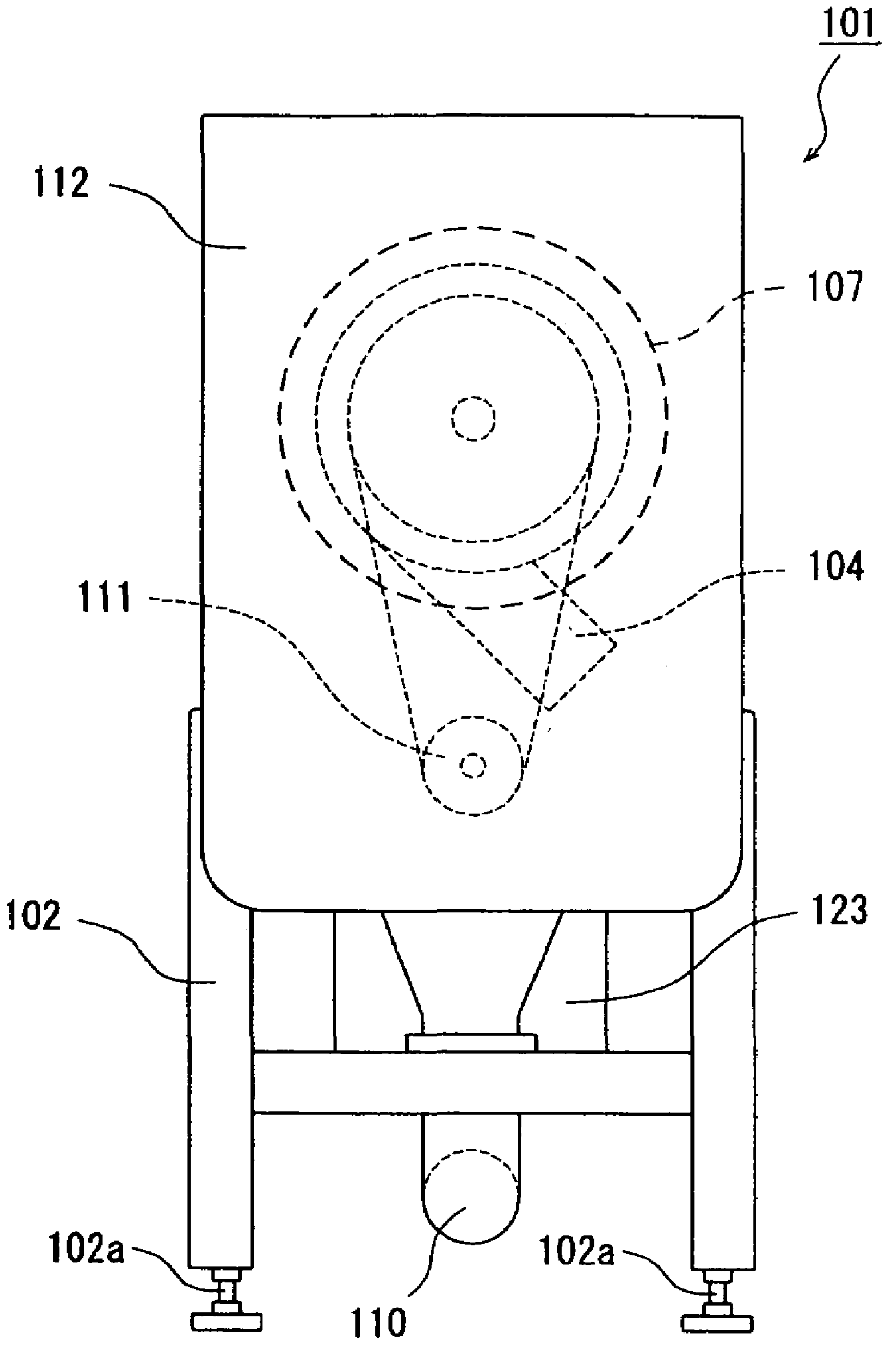
FIG. 9 is a left side view showing the inline sifter in the second embodiment.
Figure 10:
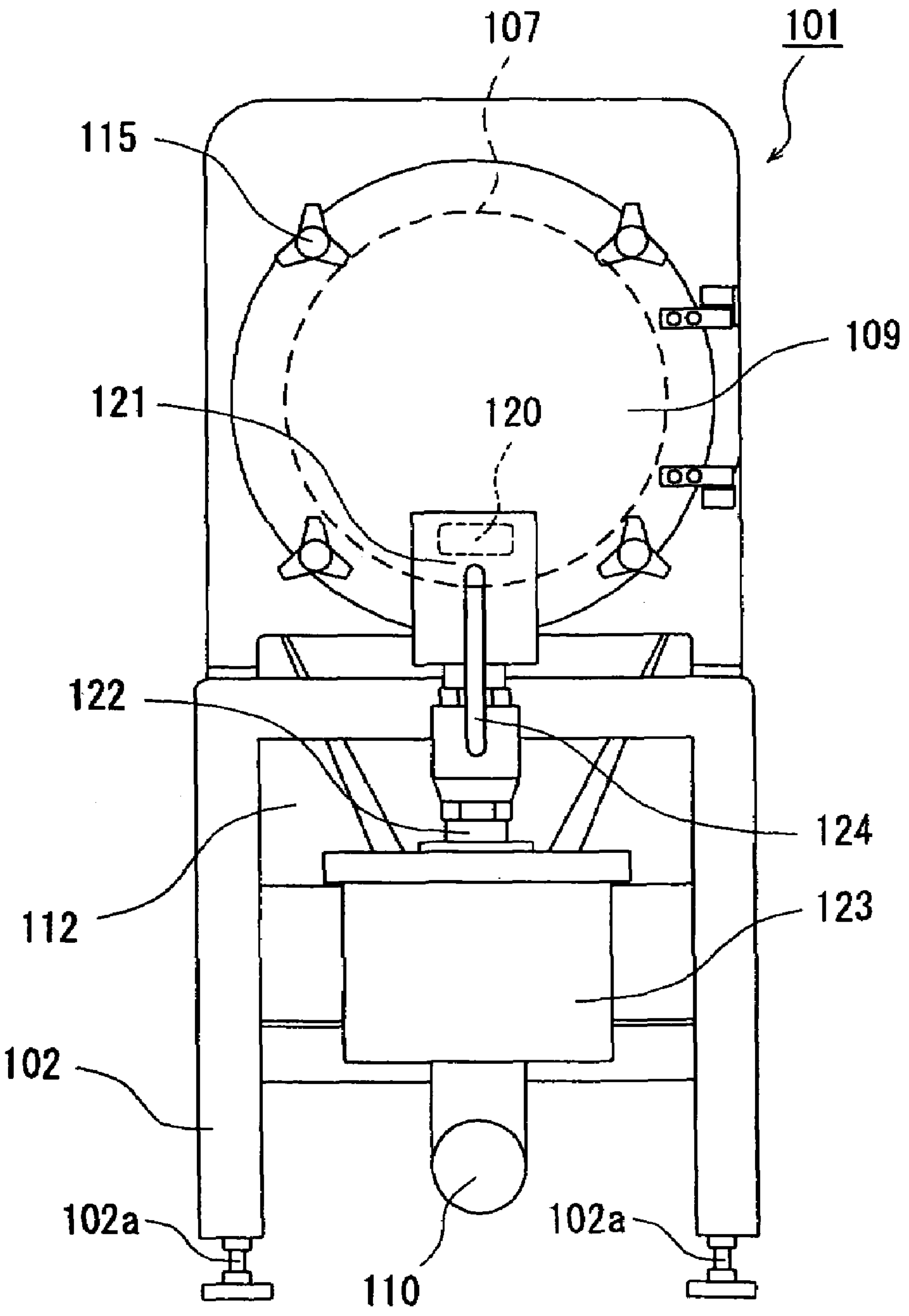
FIG. 10 is a right side view showing the inline sifter in the second embodiment.

Referring to FIGS. 5 and 6, the booster 8 spreading in the internal area 53 of the sieve 7 is attached to the outer circumferential face of the rotating shaft 6. The booster 8 has multiple (two in this embodiment) radial members 81 (see FIG. 6(*a*)) attached to both ends of a section of the rotating shaft 6 located inside the sieve 7, and multiple blades 82 that are set on and fixed to the respective ends of the radial members 81 and are extended with some inclination of a little angle (for example, in a range of 3 to 7 degrees, preferably at 5 degrees) to the axial direction of the rotating shaft 6. The booster 8 also has multiple scrapers 83 (see FIG. 6(*b*)) that are attached to all or part of the blades 82 and are a little projected from the blades 82 outward in the radial direction. Each of the scrapers 83 has an end facing the inner circumferential face of the sieve 7 across a little gap, and scrapes off the powdery material from the internal area 53 to the external area 54 through the sieve 7. The booster 8 has a pi (Π) shape from the front view and a cross shape from the side view. The scraper 83 has a groove 83*a* to receive the radial member 81 therein and fixation apertures 83*b* for fixation to the blade 82.

Each of the radial members 81 has a cross shape from the side view, in which protrusion elements 81*b* are radially projected from its center. A round opening 81*a* is formed on the center of the radial member 81 to receive and fix the rotating shaft 6 passing therethrough. Each of the protrusion elements 81*b* has a notch 81*c* on the end thereof. The base end of the blade 82 (on the side of the passage 37) has a cutter shape (for example, a triangular shape). As shown in FIG. 6(*a*), the two radial members 81 are arranged at predetermined rotation angles to shift the rotating positions from the side view. The number and the shape of the protrusion elements of the radial member 81 are set corresponding to the number and the shape of the blades 82.

A preset number (four in this embodiment) of the blades 82 are symmetrically arranged at preset angles (90 degrees in this embodiment) from the side view. The ends of each blade 82 are slightly bent in this embodiment, although the blade may be formed straight. The blade 82 has a long sheet shape from the front view. The vertical cross section of each blade 82 in a direction perpendicular to the axial direction of the rotating shaft 6 has four chamfered corners, though not being specifically illustrated.

The booster 8 is not restricted to the above structure but may have any different structure exerting the similar effects. In one example, arm members may replace the radial members. In another example, the radial members or the arm members may be penetrated through and fitted in the rotating shaft.

Figure 4:
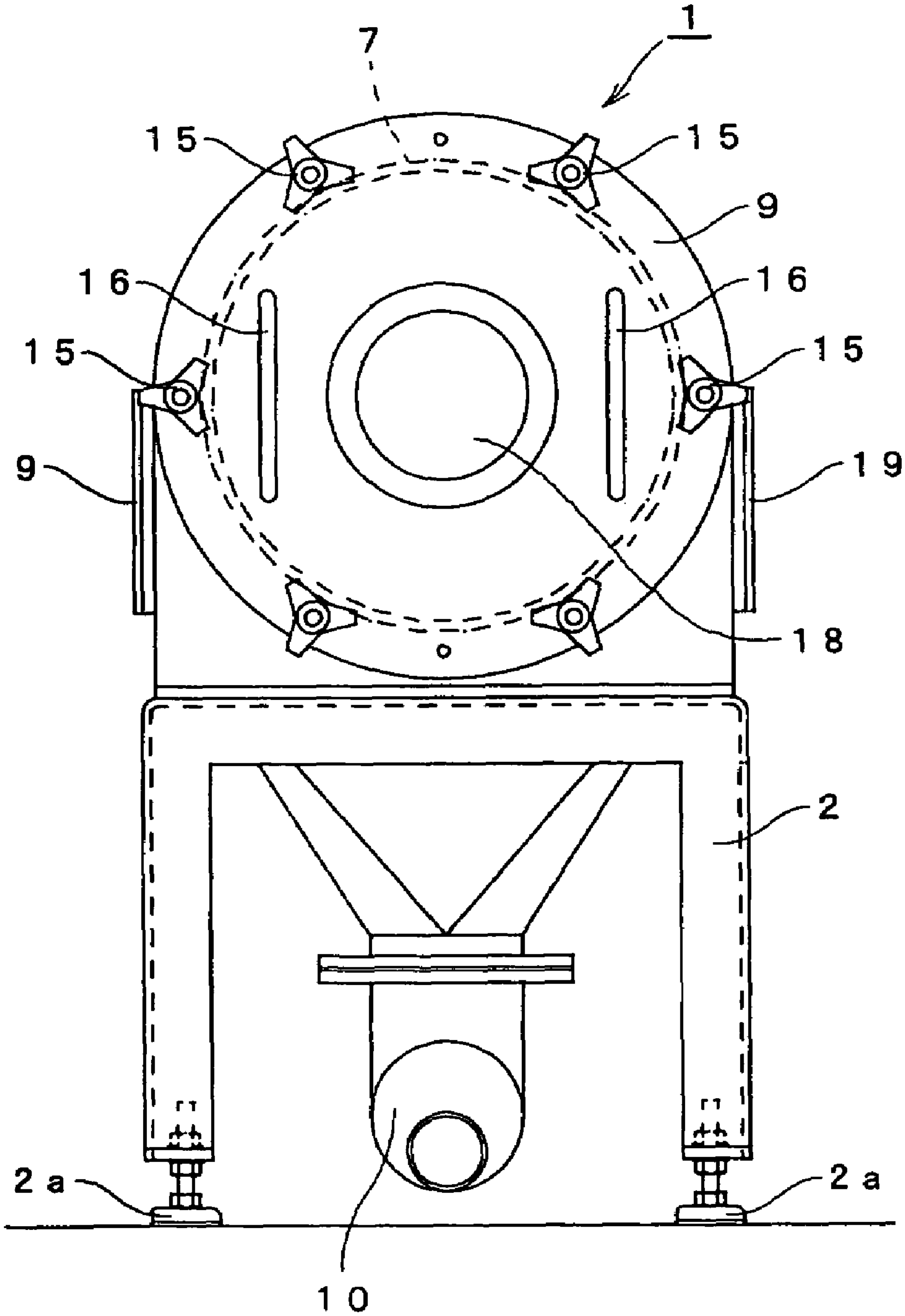
FIG. 4 is a right side view showing the inline sifter in the first embodiment.

As shown in FIGS. 4 and 5, the inspection door 9 is detachably 5 attached to a right side opening 13 of the sieve housing 50 by means of multiple attachment knobs 15. The inspection door 9 has two handles 16 across the center. The sieve 7 may be taken out through the side opening 13. Inspection openings 18 and 19 are formed respectively on the center of the inspection door 9 and in the sieve housing 50 to allow the operator to visually check the internal state of the sieve housing 50.

The operations of the inline sifter 1 are discussed below with reference to FIGS. 1 through 6. The inline sifter 1 of this embodiment is an inline-type sieve that is disposed in the middle of a pneumatic transportation line. The mixture of the powdery material and the air flown through the pneumatic transportation line and fed from the upstream line L1 of the inline sifter 1 is subjected to the sieving operation. After removal and crush of the agglutinate powdery material and removal of the foreign substances, the air-powder mixture is fed to the downstream line L2. The process of sieving the air-powder mixture in the inline sifter 1 is discussed in detail.

The upstream line L1 is connected with the air-powder mixture inlet 4, and the downstream line L2 is connected with the outlet connecting pipe 10. With a rotation of the motor 11, the rotating shaft 6 and the booster 8 rotate integrally. As the mixture of the powdery material and the air is continuously supplied in the tangential direction from the air-powder mixture inlet 4 into the supply chamber 31, the rotation forcibly makes the air-powder mixture flown to the inside of the sieving chamber 51 and to the internal area 53 of the sieve 7.

With a rotation of the rotating shaft 6, the booster 8 rotates at a high speed inside the sieve 7. The blades 82 and the radial members 81 of the booster 8 accordingly stir the air-powder mixture. The aggregates of the powdery material are crushed and removed by stirring of the air-powder mixture with the blades 82 of the booster 8. The blades 82 also take off the agglutinate powdery material adhering to the mesh of the sieve 7. The air-powder mixture containing the finer particles of the powdery material than the mesh of the sieve 7 is accordingly fed toward the external area 54 and is flown out via the outlet connecting pipe 10 to the downstream line L2. The larger particles of the powdery material than the mesh of the sieve 7 and the foreign substances are left in the internal area 53.

The booster 8 functions like a fan and sucks the air-powder mixture from the air-powder mixture receiving module 3 and discharges the air-powder mixture through the outlet connecting pipe 10. The wind power produced by the mechanical rotation of the booster 8 functions, as an intermediate auxiliary energy amplifier (also called a booster) of the pneumatic transportation, to press-feed the air-powder mixture and make the turbo action. The upstream line L1 has a rotary valve and a blower. The inside of the upstream line L1, through which the air-powder mixture is flown, has a positive pressure. The wind power (pressure) produced by the rotating booster 8 causes the inside of the supply housing 30 to have a negative pressure, while causing the inside of the outlet connecting pipe 10 to have a positive pressure. The combination of this negative pressure with the positive pressure accelerates the downstream flow of the air-powder mixture and significantly reduces the pressure loss.

The repeated sieving operations of the inline sifter 1 cause the powdery material and the foreign substances to be accumulated in the internal area 53. The operator visually checks the internal state of the inline sifter 1 through the inspection openings 18 and 19. When removal of the accumulation is required, the operator stops the operations of the inline sifter 1, loosens the attachment knobs 15 of the inspection door 9, and grasps the handles 16 to open the inspection door 9. The operator gains access to the inside of the sieving chamber 51 to remove the powdery material and the foreign substances left in the sieving chamber 51 and clean up the inside of the sieve 7. The used sieve 7 may be taken out of the sieving chamber 51 and replaced with a new sieve 7. The used sieve 7 may otherwise be taken out of the sieving chamber 51, cleaned, and reattached to the original position.

Another inline sifter 101 in a second embodiment of the invention is discussed below with reference to FIGS. 7 through 11. The inline sifter 101 has a similar structure to that of the inline sifter 1 of the first embodiment, except some differences described below.

An inspection door 109 has an exhaust port 121 with a safety valve 120 on the outside thereof. The safety valve 120 is opened when the pressure applied from a sieving module 105 by a mixture of a pneumatically transported powdery material and the air exceeds a preset level. The exhaust port 121 is open to a sieving chamber 151 and communicates with a foreign substance reservoir 123 via a duct 122. The foreign substances and the powdery material left in a sieve 107 are discharged through the exhaust port 121 and are kept in the foreign substance reservoir 123. The duct 122 has a manually handled valve 124. The manually handled valve 124 may be replaced with a solenoid valve (not shown).

Figure 11:
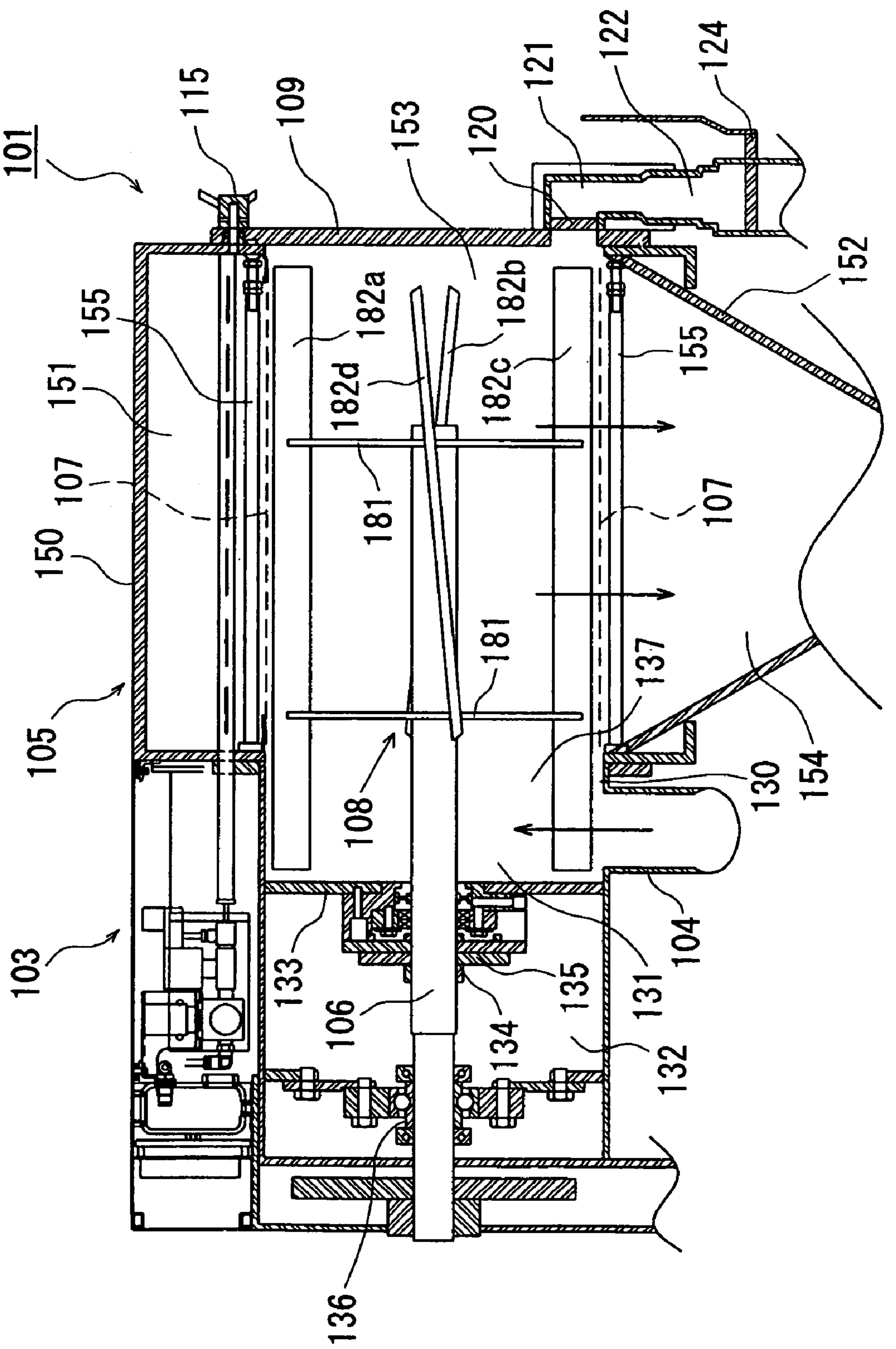
FIG. 11 shows the internal structure of the main part of the inline sifter in the second embodiment.

A booster 108, which is practically similar to the booster 8 of the first embodiment with some differences, is attached to the outer circumferential face of a rotating shaft 106, as shown in FIG. 11. The following mainly describes the differences of the booster 108 from the booster 8 of the first embodiment. The like constituents are expressed by the like numerals+100.

Figure 12:
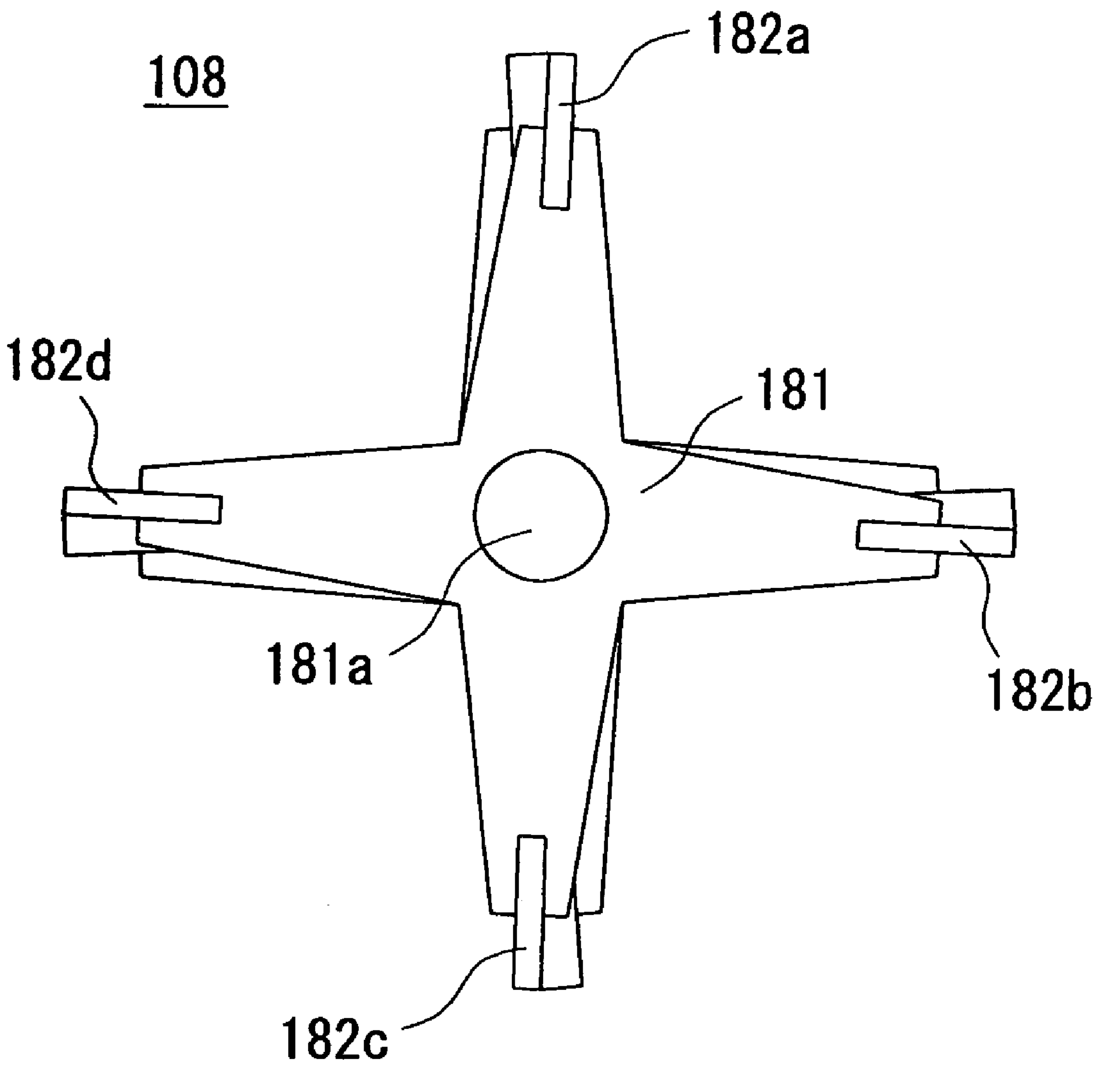
FIG. 12 is a side view showing a booster in the second embodiment.

As shown in FIGS. 11 and 12, among multiple (for example, four) blades 182*a* through 182*d*, some blades or the blades 182*a* and 182*c* arranged at a preset angle (for example, 180 degrees) in this embodiment are longer than the other blades or the blades 182*b* and 182*d*. The shorter blades 182*b* and 182*d* are inside an internal area 153 of the sieve 107 set in the sieving chamber 151, whereas the longer blades 182*a* and 182*c* are extended from the sieving chamber 151 to a specific area of a passage 137 and a supply chamber 131 without the sieve 107. The blades 182*a* and 182*c* rotate and cross the opening of an air-powder mixture inlet 104 to stir the air-powder mixture fed from the air-powder mixture inlet 104.

A preset number (two in this embodiment) of cylindrical inner cleaning units 156 are arranged horizontally in an axial direction in an external area 154 on the upper portion of the sieving chamber 151. Each of the inner cleaning units 156 has a high-pressure pulsed air supply opening 157 that receives the high-pressure pulsed air fed from a high-pressure pulsed air generator (not shown) and a high-pressure pulsed air ejection opening 158. The high-pressure pulsed air is supplied from the high-pressure pulsed air ejection opening 158 through a high-pressure pulsed air jet pipe 159 and is ejected from the high-pressure pulsed air jet pipe 159 toward the sieve 107. The high-pressure pulsed air jet pipe 159 has slits 160 formed along its longitudinal axis and is disposed outside the sieve 107 in the sieving chamber 151. The shock waves of the high-pressure pulsed air ejected from the slits 160 blow off the powdery material adhering to the sieve 107. The inspection door 9 is opened and closed via hinges. The supply chamber 131 and a bearing chamber 132 have an outer cover 112.

The operations of the inline sifter 101 are discussed with reference to FIGS. 7 through 12.

The process of sieving the powdery material in the inline sifter 101 is similar to that of the first embodiment. In the inline sifter 1 of the first embodiment, when the powdery material and the foreign substances are accumulated in the internal area 53, the operator should stop the operations of the inline sifter 1, open the inspection door 9, and remove the powdery material and the foreign substances left in the sieve 7 at regular intervals. In the inline sifter 101 of the second embodiment, on the other hand, when the pressure applied from the sieving module 105 exceeds the preset level, the safety valve 120 opens to automatically discharge the powdery material and the foreign substances left in the sieve 107. The arrangement of the second embodiment allows for removal of the powdery material and the foreign substances left in the sieve 107 to clean up the inside of the sieve 107 without opening the inspection door 109. The used sieve 107 may be replaced with a new sieve 107 via the inspection door 109.

Among all the blades 182*a* through 182*d*, the preset number of (for example, two) blades 182*a* and 182*c* are used to stir the inside of the supply chamber 131 and successively feed a predetermined quantity of the air-powder mixture to the sieving chamber 151. Even in the case of a pulsated flow of the air-powder mixture supplied from the air-powder mixture inlet 104, the arrangement of stirring the inside of the supply chamber 131 with the blades 182*a* and 182*c* ensures stable supplies to the sieving chamber 151.

Figure 13:
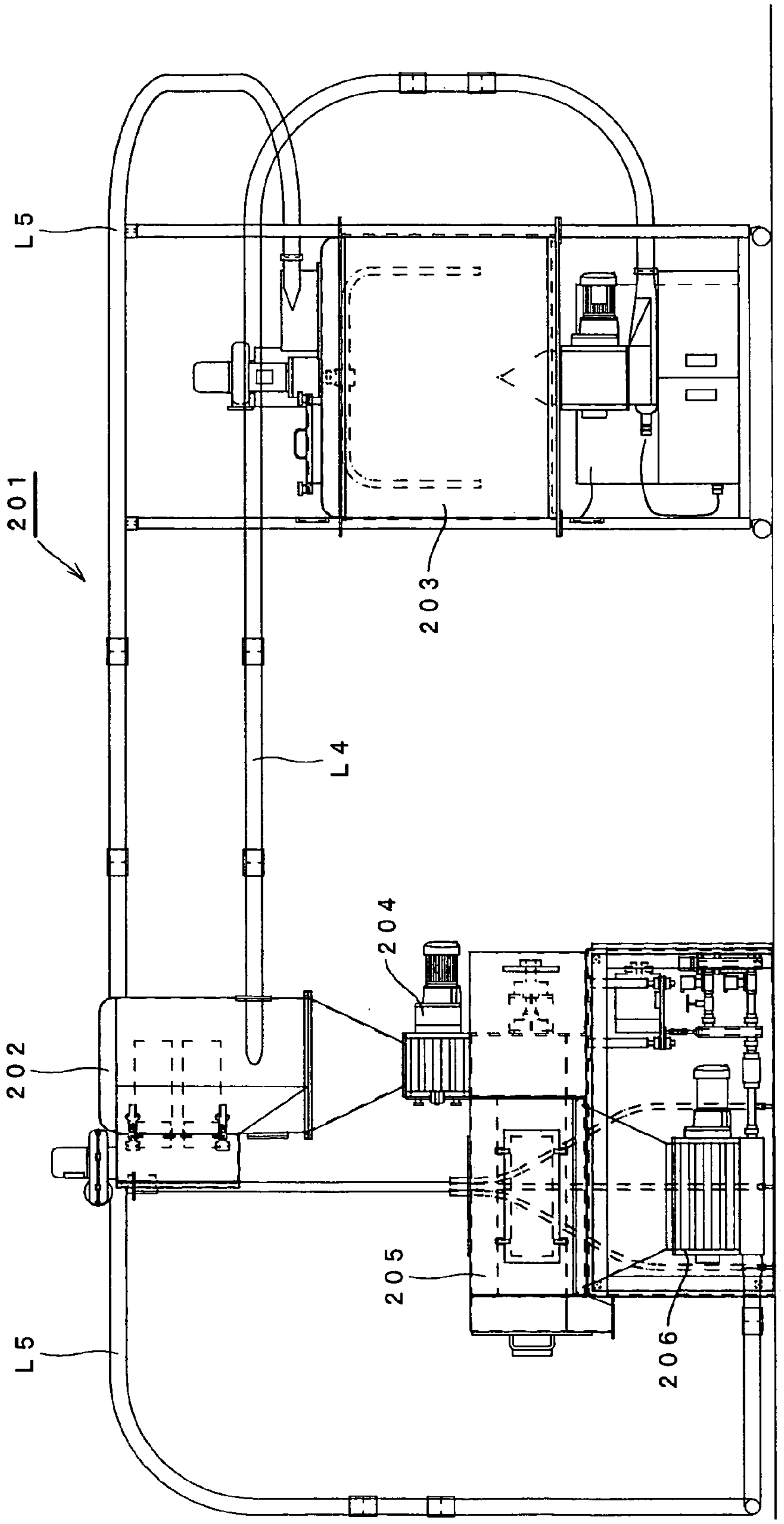
FIG. 13 is a front view showing an inline sieve system in a comparative example.
Figure 14:
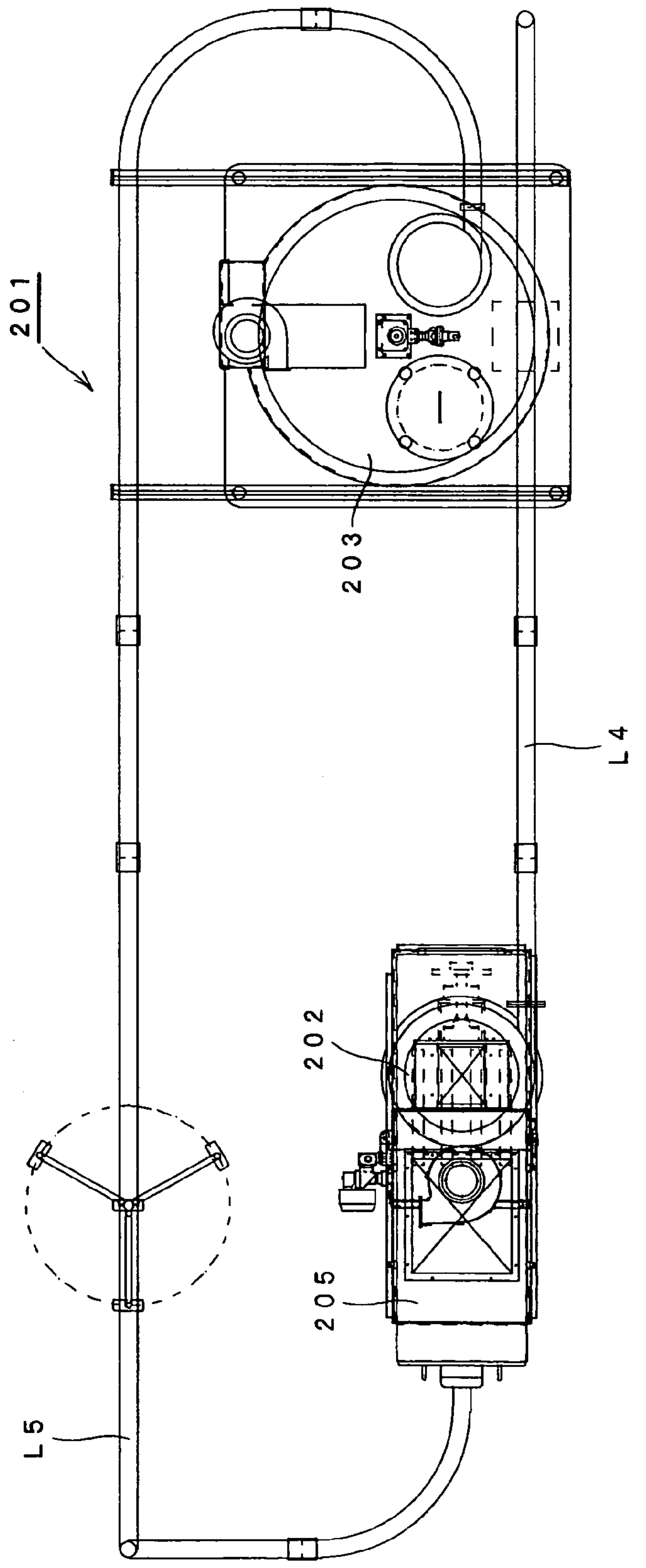
FIG. 14 is a plan view showing the inline sieve system in the comparative example.
Figure 15:
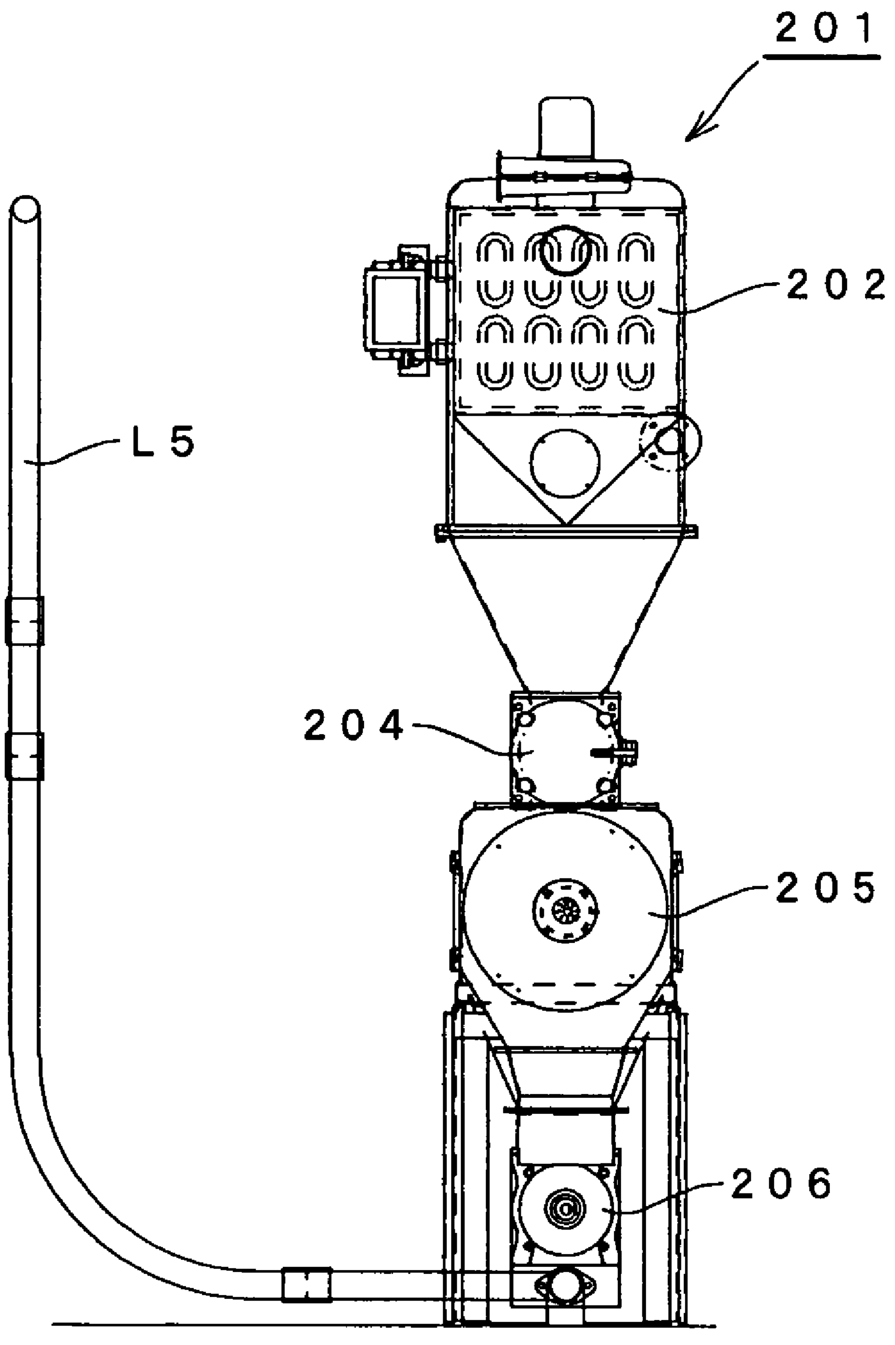
FIG. 15 is a left side view showing the inline sieve system in the comparative example.
Figure 16:
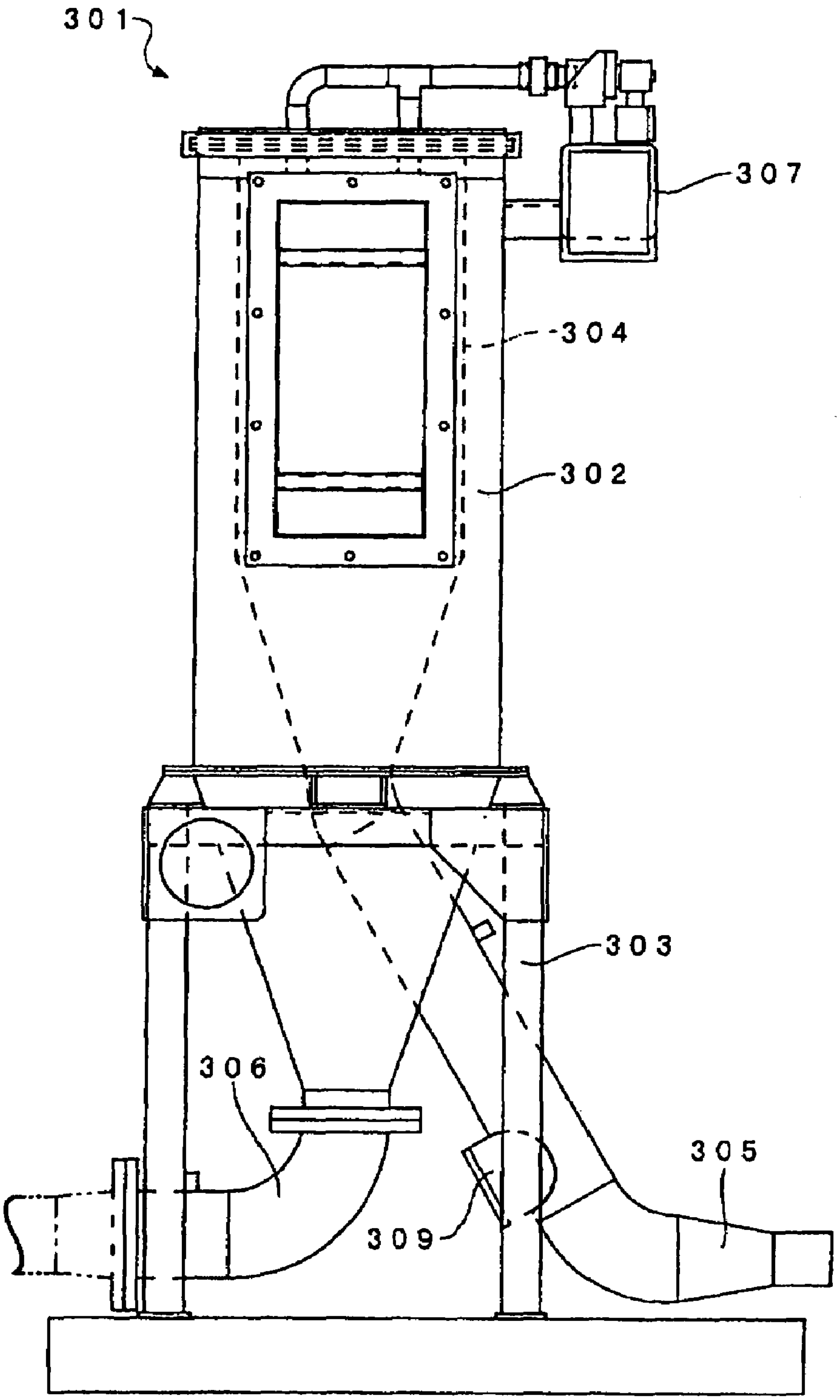
FIG. 16 PRIOR ART
FIG. 16 is a front view showing a prior art inline sifter.
Figure 17:
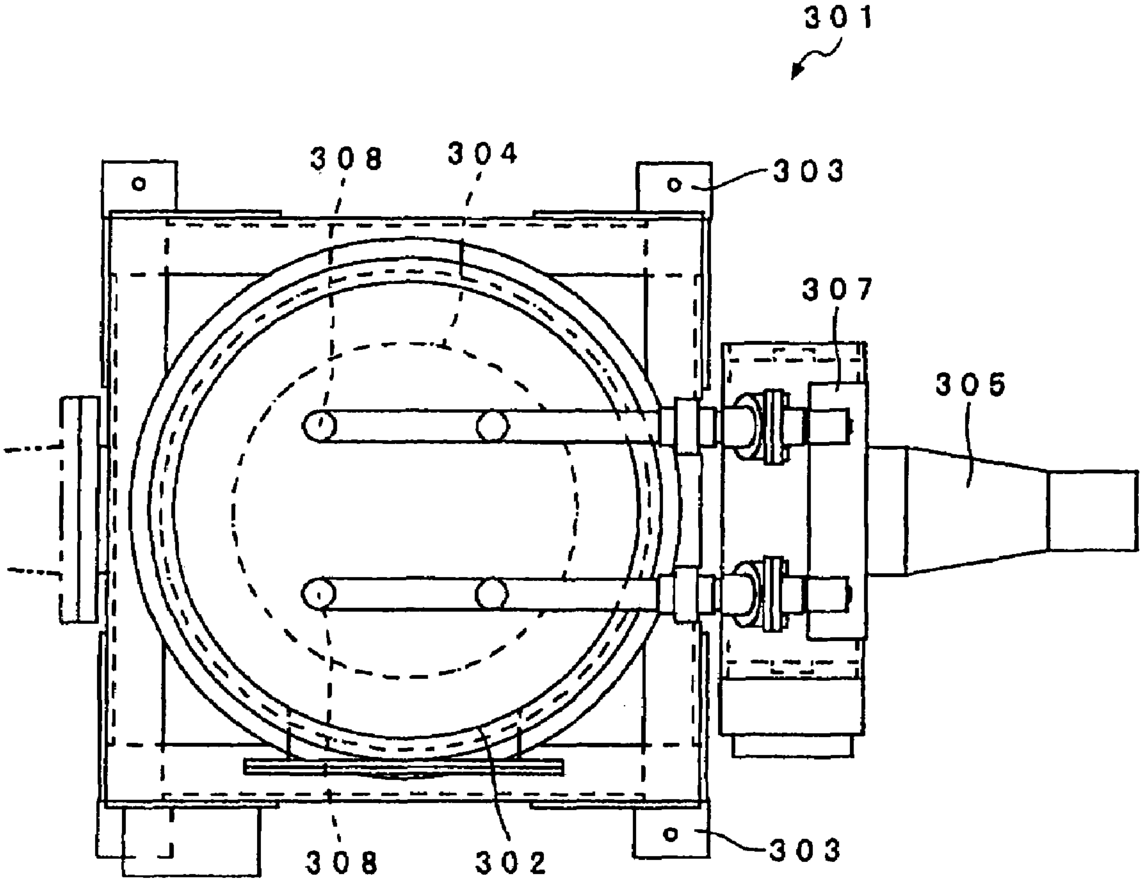
FIG. 17 PRIOR ART
FIG. 17 is a plan view showing the prior art inline sifter.
Figure 18:
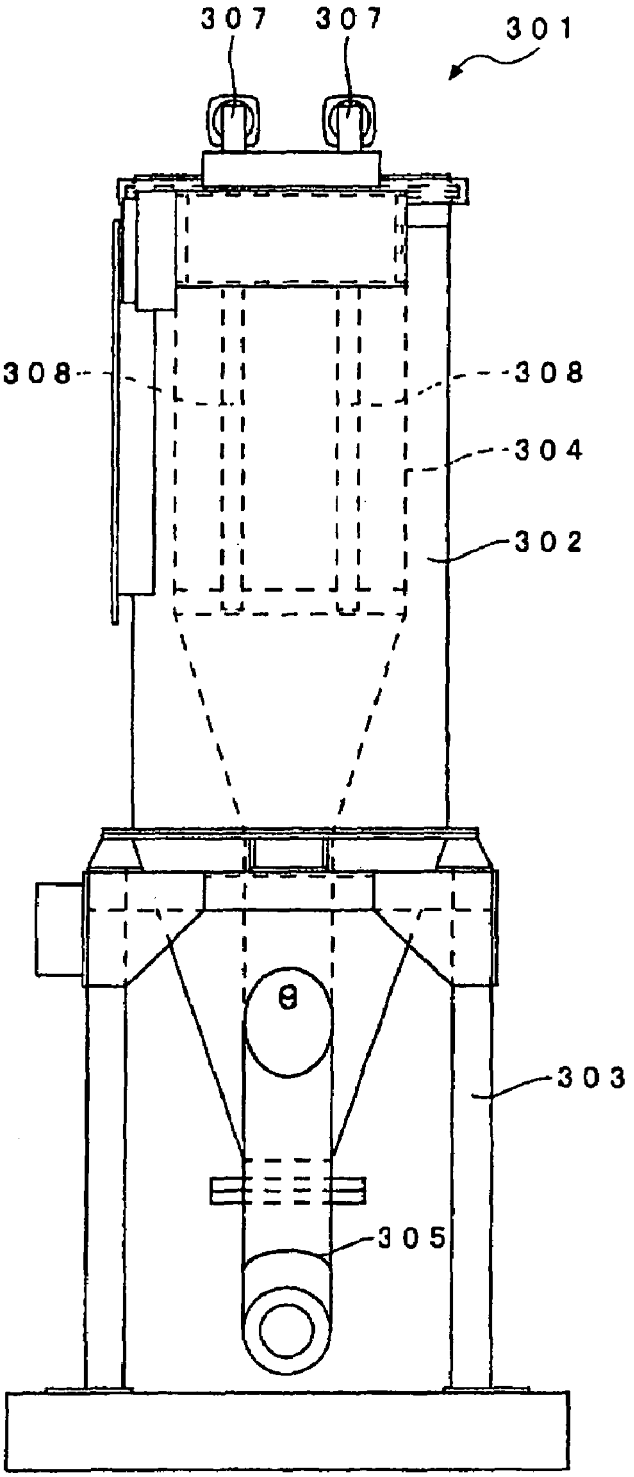
FIG. 18 PRIOR ART
FIG. 18 is a right side view showing the prior art inline sifter.

An inline sieve system 201 of a comparative example is discussed with reference to FIGS. 13 through 15. In this inline sieve system 201, a receiver filter 202 receives a mixture of a powdery material and the air supplied from the upstream and separates the powdery material from the air. The separated air is flown to a converging device 203 with a table feeder via a line L4. The separated powdery material is fed via a line L5 through a rotary valve 204 to a sieve 205 with a rotating shaft having both ends supported in bearings. After removal of aggregates, the sieved powdery material is flown through a rotary valve 206 to the converging device 203 via the line L5. The inline sieve system 201 once divides the air-powder mixture into the powdery material and the air and makes the flows of the powdery material and the air convergent after removal of aggregates. This arrangement requires the converging device 203 and the rotary valves 204 and 206 and thus undesirably increases the size of the whole system.

The inline sifter 1 of the first embodiment and the inline sifter 101 of the second embodiment discussed above have the following effects:

(1) The powdery material is press-fed by means of the mechanical rotational force of the booster 8. The combination of the wind power of the booster 8 with the pneumatic transportation pressure has the boosting (amplifying) function. This arrangement significantly reduces the pressure loss to a negligible level, although a little pressure loss is inevitable when the air-powder mixture passes through the sieve 7. This results in a remarkable enhancement of the sieving ability. For example, in the case of pneumatic transportation of flour at a mixing ratio of 8 to 10, the pressure loss is at a very low level of 0.1 to 1.0 kPa. The sieve 7 can thus have a very fine mesh.

(2) The prior art structure only removes aggregates of the powdery material but does not crush the aggregates. There is accordingly a good possibility that some aggregates are not removed but are left. The blades 82 mechanically force to press the powdery material in the internal area 53 of the sieve 7 to crush the aggregates. Setting the inline sifter of the embodiment in an existing pneumatic transportation line effectively removes the foreign substances and efficiently removes and crushes (fractures) aggregates at a high speed. Since the booster 8 rotates at a high speed, any bolts and nuts left inside the sieve 7 may damage the sieve 7. These bolts and nuts should thus be removed separately by a vibrating screen.

(3) The air-powder mixture supplied from the upstream line L1 is press-fed by means of the mechanical power of the booster 8. Compared with the structure using only the air pressure for feeding, this arrangement effectively prevents the clogging of the sieve 7.

(4) The vibration-free, ultra-low noise design keeps the quiet environment.

(5) The large-sized inspection door facilitates replacement of the sieve, maintenance, and cleaning.

(6) The rotating shaft 6 has a cantilevered structure and is supported at the first bearing 35 and the second bearing 36 close to the motor 11. This arrangement desirably prevents the load of the rotating shaft 6 from being applied on the inspection door 9 and enables the inspection door 9 to be readily opened and closed, thus ensuring easy centering of the shaft during maintenance. In the inline sieve system 201 of the comparative example, on the other hand, the rotating shaft has both ends supported in bearings. There is accordingly a bearing at the inspection door. When the inspection door is opened, the end of the rotating shaft falls down due to the self weight of the rotating shaft. This makes attachment and detachment of the inspection door rather troublesome. The arrangement of the embodiment is free from such disadvantage as discussed above.

(7) In the case of a pulsated flow of the air-powder mixture supplied from the air-powder mixture inlet 104 to the supply chamber 131, a loading is applied to the sieve 107 to make the sieving operations unstable. The extension of the blades 182*a* and 182*c* to the supply chamber 131 enables the air-powder mixture to be stirred in the supply chamber 131 without the sieve 107 and thus relives the pulsation of the air-powder mixture. This arrangement thus ensures stable supplies of the air-powder mixture fed from the air-powder mixture receiving module 103 to the sieving chamber 151.

(8) The shock waves of the high-pressure pulsed air ejected from the inner cleaning units 156 blow off the powdery material adhering to the sieve 107, so as to effectively prevent the sieve 107 from being clogged.

(9) The inspection door 109 has the exhaust port 121 with the safety valve 120. This ensures efficient discharge of the powdery material and the foreign substances left in the internal area 153 of the sieve 107.

(10) In either of the above embodiments, the booster 8 or 108 is arranged to be rotatable inside the sieve 7 or 107. This structure desirably attains the narrowed width and the reduced size of the whole apparatus, while ensuring the high efficiency.

The above embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

INDUSTRIAL APPLICABILITY

In the structure of the invention, the wind power boosting effects of the wind power amplifier effectively reduce the pressure loss in the inline sifter and enhance the efficiency of removing and crushing aggregates of the powdery material. This arrangement also allows the sieve to have a fine mesh.

What is claimed is:

1. An inline sifter comprising:

a gas-powder mixture receiving module provided with a supply chamber, which receives a mixture of a gas and a pneumatically transported powdery material from a gas-powder mixture inlet;

a sieving module provided with a sieving chamber, which laterally communicates with said supply chamber of said gas-powder mixture receiving module;

a rotating mechanism provided with a rotating shaft, which is laterally extended inside said supply chamber and said sieving chamber;

a cylindrical sieve arranged such that said rotating shaft extended in said sieving chamber passes through a center thereof;

a wind power amplifier located in an internal area of said sieve and having multiple blades fixed to said rotating shaft to amplify wind power and pressing said powdery material out from said internal area of said sieve toward an external area;

a removal member used to remove a remaining powdery material and/or foreign substances, which has not passed through said sieve, from said internal area of said sieve;

an outlet used to discharge a sieved powdery material, which has passed through said sieve from said internal area toward the external area, wherein said gas-powder mixture is supplied in a circumferential direction along a circumferential face of said supply chamber, flows around said rotating shaft, and is fed into said sieving chamber, wherein said wind power amplifier includes a support member that radially extends from said rotating shaft, wherein said support member comprises multiple protrusion plates, to which said multiple blades are fixed, that radially project from a central portion of said support member, and a through hole formed in said central portion to receive said rotating shaft passing therethrough, and wherein a principle surface of each protrusion plate extends in an orthogonal direction which is orthogonal to an axial direction of said rotating shaft such that a width of the principle surface of said protrusion plate in the orthogonal direction is larger than a width of said protrusion plate in the axial direction.

2. An inline sifter according to claim 1, wherein said removal member has an exhaust port, which is provided with an openable and closable valve or shutter and is connected to a foreign substance reservoir disposed outside of said removal member, and said remaining powdery material and/or foreign substances that has not passed through said sieve is discharged through said open valve or shutter to said foreign substance reservoir.

* * * * *